United States Patent
Schlepple et al.

(10) Patent No.: US 11,662,532 B2
(45) Date of Patent: *May 30, 2023

(54) COUPLING MULTI-CHANNEL LASER TO MULTICORE FIBER

(71) Applicant: Cisco Technology, Inc., San Jose, CA (US)

(72) Inventors: Norbert Schlepple, Macungie, PA (US); Jock T. Bovington, La Mesa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,312

(22) Filed: Dec. 8, 2021

(65) Prior Publication Data

US 2022/0099901 A1    Mar. 31, 2022

Related U.S. Application Data

(63) Continuation of application No. 16/940,528, filed on Jul. 28, 2020, now Pat. No. 11,199,668.

(51) Int. Cl.
G02B 6/42    (2006.01)
G02B 6/02    (2006.01)

(52) U.S. Cl.
CPC ....... *G02B 6/4204* (2013.01); *G02B 6/02042* (2013.01); *G02B 6/4226* (2013.01)

(58) Field of Classification Search
CPC .............. G02B 6/02042; G02B 6/3885; H01S 5/02212
See application file for complete search history.

(56) References Cited

U.S. PATENT DOCUMENTS 11,199,668 B1 * 12/2021 Schlepple ............ G02B 6/4204

* cited by examiner

*Primary Examiner* — Michael Stahl
(74) *Attorney, Agent, or Firm* — Patterson + Sheridan, LLP (57) ABSTRACT

Aspects described herein include a method including arranging a laser die on a substrate. The laser die has multiple channels that are arranged with a first planar arrangement proximate to a facet of the laser die. The substrate is arranged on a housing component. The method further includes aligning a single lens to the facet, and aligning a multicore optical fiber to the laser die through the single lens. The multicore optical fiber has a plurality of optical cores that are arranged with a second planar arrangement. Aligning the multicore optical fiber to the laser die includes attaching the multicore optical fiber to the housing component and rotationally aligning the multicore optical fiber to align the second planar arrangement with the first planar arrangement.

20 Claims, 7 Drawing Sheets

COUPLING MULTI-CHANNEL LASER TO MULTICORE FIBER

CROSS-REFERENCE TO RELATED APPLICATIONS

This application is a continuation of co-pending U.S. patent application Ser. No. 16/940,528 filed Jul. 28, 2020. The aforementioned related patent application is herein incorporated by reference in its entirety.

TECHNICAL FIELD

Embodiments presented in this disclosure generally relate to optical devices, and more specifically, to techniques for coupling a multi-channel laser to a multicore optical fiber.

BACKGROUND

To support increased bandwidth requirements, optical devices may include increasing numbers of optical channels. However, using single-channel optical fibers such as single-mode fiber (SMF) or polarization-maintaining fiber (PMF) for the multiple optical channels occupies a large volume for fiber management, as well as reduces the channel density at the fiber termination, which may require increased packaging size and/or may affect the spacing of components within packaging of a given size.

Multicore fibers can significantly reduce a fiber count within the packaging, and in some cases may have a same outer diameter as single-mode optical fibers. However, solutions for optical coupling with the optical cores of the multicore fiber, such as photonic light-wave circuits that fan-in to the relatively small pitch between the optical cores, may impose significant material and/or process costs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method comprising arranging a laser die on a substrate. The laser die has multiple channels that are arranged with a first planar arrangement proximate to a facet of the laser die. The method further comprises aligning a single lens to the facet, and aligning a multicore optical fiber to the laser die through the single lens. The multicore optical fiber has a plurality of optical cores that are arranged with a second planar arrangement. Aligning the multicore optical fiber to the laser die comprises rotationally aligning the multicore optical fiber to align the second planar arrangement with the first planar arrangement.

Another embodiment presented in this disclosure is an optical device comprising a substrate and a laser die arranged on the substrate. The laser die has multiple channels that are arranged with a first planar arrangement proximate a facet of the laser die. The optical further comprises a single lens aligned to the facet, and a multicore optical fiber aligned to the laser die through the single lens. The multicore optical fiber has a plurality of optical cores that are arranged with a second planar arrangement. The multicore optical fiber is rotationally arranged such that the second planar arrangement is aligned with the first planar arrangement.

Another embodiment presented in this disclosure is a computer program product comprising a computer-readable storage medium having computer-readable program code embodied therewith. The computer-readable program code is executable by one or more computer processors to perform an operation comprising arranging a laser die on a substrate. The laser die has multiple channels that are arranged with a first planar arrangement proximate to a facet of the laser die. The operation further comprises aligning a single lens to the facet, and aligning a multicore optical fiber to the laser die through the single lens. The multicore optical fiber has a plurality of optical cores that are arranged with a second planar arrangement. Aligning the multicore optical fiber to the laser die comprises rotationally aligning the multicore optical fiber to align the second planar arrangement with the first planar arrangement.

EXAMPLE EMBODIMENTS

Solutions for optical coupling with a multicore optical fiber include photonic light-wave circuits, which fan-in from separate optical channels to the relatively small pitch between the cores of the multicore fiber. However, implementations of optical devices using photonic light-wave circuits may tend to occupy a relatively large volume, and/or may impose significant material and/or process costs.

In some embodiments, a method comprises arranging a laser die on a substrate. The laser die has multiple channels that are arranged with a first planar arrangement proximate to a facet of the laser die. The method further comprises aligning a single lens to the facet, and aligning a multicore optical fiber to the laser die through the single lens. The multicore optical fiber has a plurality of optical cores that are arranged with a second planar arrangement, e.g., arranged linearly within the planar arrangement. Aligning the multicore optical fiber to the laser die comprises rotationally aligning the multicore optical fiber to align the second planar arrangement with the first planar arrangement.

Beneficially, the relatively small pitch between the optical cores of the multicore fiber permits a single lens to optically couple all of the optical cores with the multiple channels of the laser die, providing suitable optical performance without imposing significant material and process costs. The relatively small pitch allows other components to be shared, e.g., a single optical isolator shared by the multiple channels. Further, using the single lens to optically couple the multiple channels negates a requirement for a minimum free space channel and/or channel pitch.

Figures 1A, 1B:
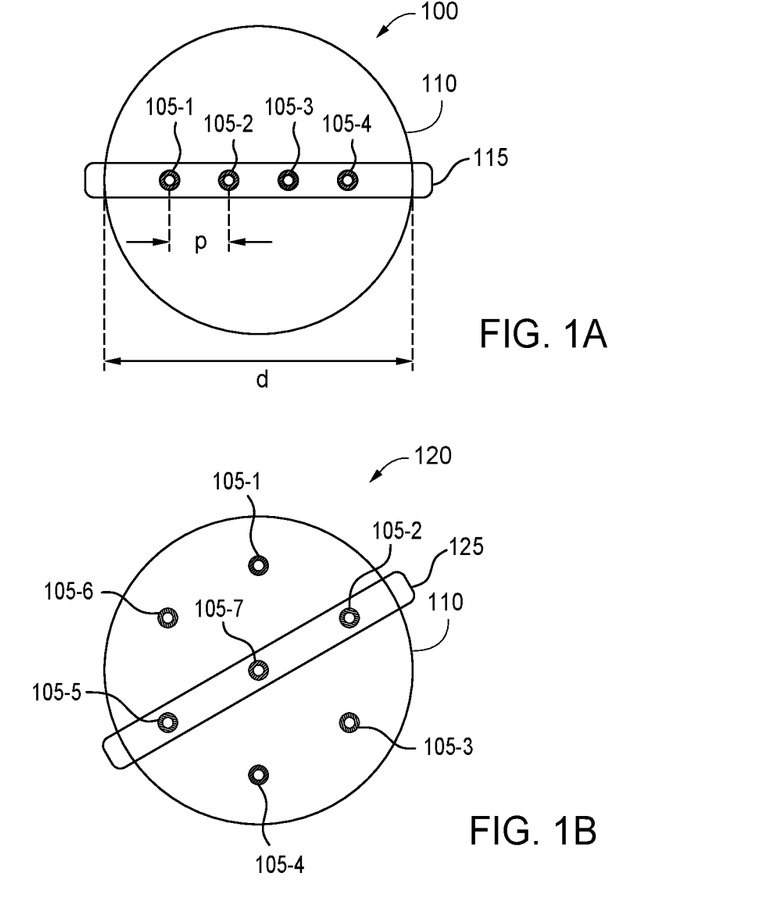
FIGS. 1A, 1B, and 1C illustrate exemplary implementations of a multicore optical fiber, according to one or more embodiments.
Figure 1C:
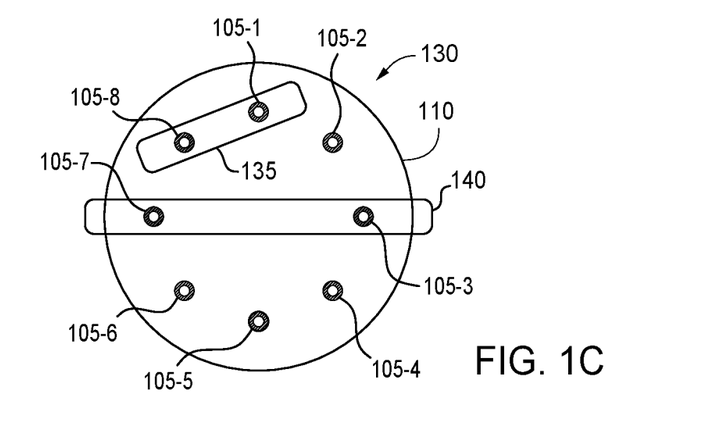

FIGS. 1A, 1B, and 1C illustrate exemplary implementations of a multicore optical fiber, according to one or more embodiments. More specifically, FIG. 1A represents a cross-section view (or an end view) of a multicore optical fiber 100 comprising a plurality of optical cores 105-1, 105-2, 105-3, 105-4 (also referred to herein as "cores") and a cladding 110. The cores 105-1, 105-2, 105-3, 105-4 and the cladding 110 may be formed of any materials providing suitable refractive indices, as will be understood by the person of ordinary skill in the art. The cores 105-1, 105-2, 105-3, 105-4 are arranged along a line within the plane depicted in FIG. 1A (also referred to herein as the planar arrangement of the cores 105-1, 105-2, 105-3, 105-4).

Although the multicore optical fiber 100 includes four (4) cores in a linear arrangement, alternative numbers and/or alternative planar arrangements of the cores 105-1, 105-2, 105-3, 105-4 are also contemplated. For example, FIG. 1B represents a cross-section view (or an end view) of a multicore optical fiber 120 comprising seven (7) cores 105-1, 105-2, . . . , 105-7 in a star-shaped planar arrangement. FIG. 1C represents a cross-section view (or an end view) of a multicore optical fiber 130 comprising eight cores 105-1, 105-2, . . . , 105-8 in a circular planar arrangement (e.g., where the cores 105-1, 105-2, . . . , 105-8 are evenly spaced with different radial angles). Other regular and/or irregular planar arrangements are also contemplated (e.g., rectangular). Further, in some embodiments the multicore optical fibers 100, 120, 130 may include one or more elements (e.g., stress rods) arranged relative to the cores 105-1, 105-2, . . . , 105-8 such that the multicore optical fibers 100, 120, 130 are polarization-maintaining multicore optical fibers.

The multicore optical fibers 100, 120, 130 may have any suitable dimensioning. In one embodiment, the multicore optical fibers 100, 120, 130 have an outer diameter d of about 125 microns, although other values are also contemplated. Generally, adjacent cores 105-1, 105-2, . . . , 105-8 may have any suitable spacing within the multicore optical fibers 100, 120, 130. In some embodiments, a pitch p between adjacent cores 105-1, 105-2, . . . , 105-8 may be as large as permitted by the outer diameter d of the multicore optical fibers 100, 120, 130, as larger spacing may be effective to mitigate interference between optical signals carried on the adjacent cores 105-1, 105-2, . . . , 105-8. In one embodiment, corresponding to the outer diameter d of about 125 microns, the pitch p between adjacent cores 105-1, 105-2, . . . , 105-8 may be in the tens of microns (e.g., between about 20 microns and about 30 microns).

When optically aligning any of the multicore optical fibers 100, 120, 130 with a multi-channel laser die, an angular alignment of the cores 105-1, 105-2, . . . , 105-8 (e.g., relative alignment of the cores 105-1, 105-2, . . . , 105-8 within the plane of the planar arrangement) may be performed using two or more of the cores 105-1, 105-2, . . . , 105-8 that are arranged in a line. Any suitable number of the cores 105-1, 105-2, . . . , 105-8 are contemplated. For example, four (4) cores 105-1, 105-2, 105-3, 105-4 (shown as angular alignment group 115) may be used for angular alignment of the multicore optical fiber 100, three (3) cores 105-2, 105-5, 105-7 (shown as angular alignment group 125) may be used for the multicore optical fiber 120, and two (2) cores 105-3, 105-7 (shown as angular alignment group 140) may be used for the multicore optical fiber 130. Notably, not all of the cores 105-1, 105-2, . . . , 105-8 arranged in a particular line need be used for angular alignment (e.g., selecting two or three of the cores 105-1, 105-2, 105-3, 105-4 for the multicore optical fiber 100), and the selected ones of the cores 105-1, 105-2, . . . , 105-8 need not be adjacent to each other within the line. Further, the line in which the cores 105-1, 105-2, . . . , 105-8 are arranged need not pass through a center of the multicore optical fibers 100, 120, 130, as with the angular alignment group 135 comprising the cores 105-1, 105-8.

Figure 2:
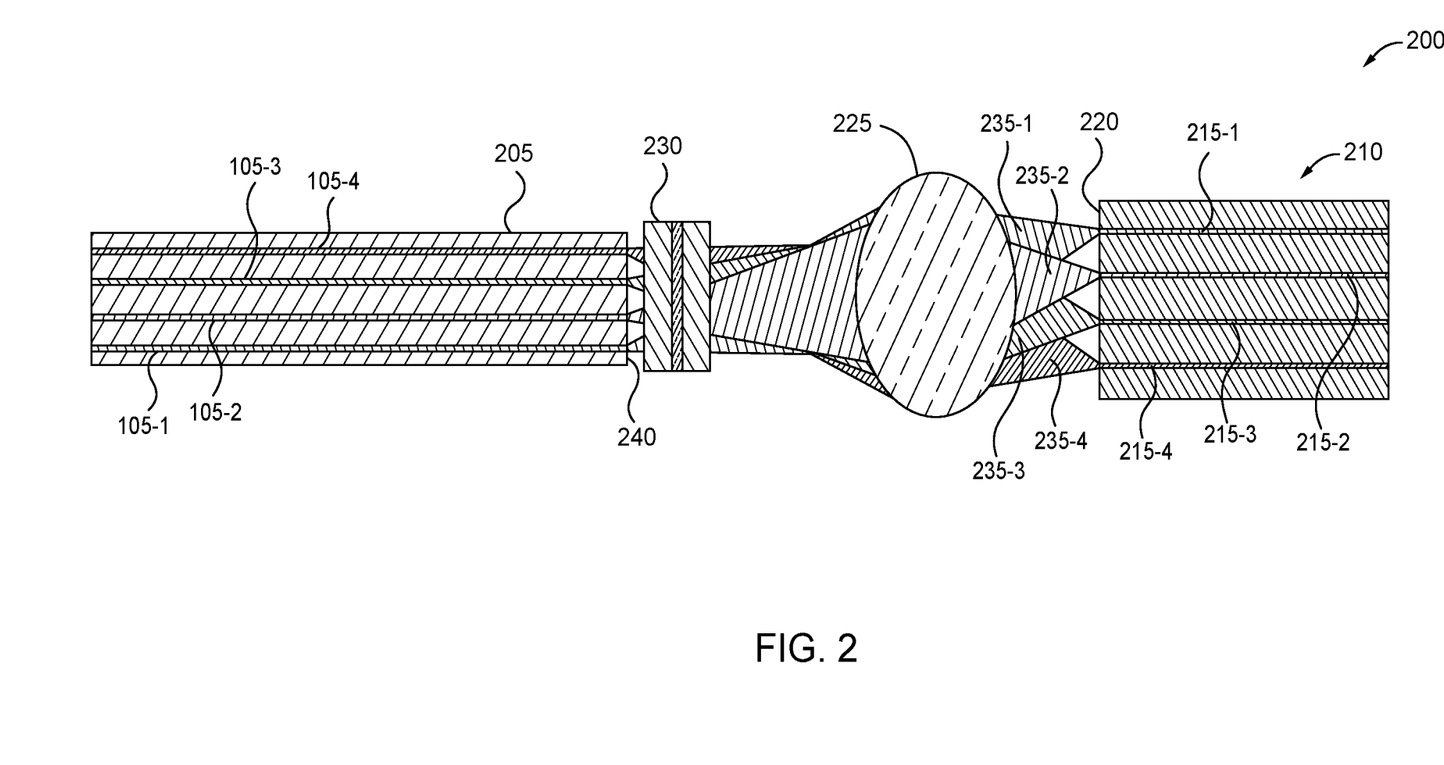
FIG. 2 is a diagram illustrating coupling of a multicore optical fiber with a multi-channel laser die, according to one or more embodiments.

FIG. 2 is a diagram 200 illustrating coupling of a multicore optical fiber 205 with a multi-channel laser die 210 (also referred to herein as "laser die"), according to one more embodiments. The features illustrated in the diagram 200 may be used in conjunction with other embodiments. For example, the multicore optical fiber 205 may represent any of the multicore optical fibers 100, 120, 130 that are depicted in FIGS. 1A, 1B, 1C. Note that the various components and the relative arrangement of the components are not drawn to scale in the diagram 200.

The laser die 210 may include any semiconductor-based laser. In some embodiments, the laser die 210 is formed using III-V material layers that are epitaxially grown on a substrate (e.g., a silicon substrate). The laser die 210 includes a plurality of channels 215-1, 215-2, 215-3, 215-4, each of which is configured to generate and deliver optical energy. The optical energy delivered by the plurality of channels 215-1, 215-2, 215-3, 215-4 may have the same or differing wavelengths. The plurality of channels 215-1, 215-2, 215-3, 215-4 are arranged with a planar arrangement proximate to a facet 220 of the laser die 210. The facet 220 of the laser die 210 may be formed using any suitable techniques, such as etching, mechanical sawing, surface grinding, and so forth. In one example, the channels 215-1, 215-2, 215-3, 215-4 are formed as optical waveguides that extend to the facet 220 (e.g., terminate at the facet 220). In another example, the optical waveguides extend close to the facet 220 (e.g., within a few microns), such that optical energy exiting the optical waveguides propagates partly through another semiconductor material (e.g., silicon) to exit the facet 220.

In the diagram 200, a single lens 225 and a single optical isolator 230 are arranged between the laser die 210 and the multicore optical fiber 205. The lens 225 may be formed of any suitable materials and may have any suitable dimensioning. The lens 225 is aligned to the facet 220. Optical energy exits the channels 215-1, 215-2, 215-3, 215-4, which is shown in the diagram 200 respectively as optical signals 235-1, 235-2, 235-3, 235-4 (collectively or generically referred to as optical signal(s) 235). The optical energy is directed through the lens 225, through the optical isolator 230, and toward an endface 240 of the multicore optical fiber 205.

To ensure that each of the cores 105-1, 105-2, 105-3, 105-4 optically align with a respective one of the channels 215-1, 215-2, 215-3, 215-4, the multicore optical fiber 205 may be rotationally aligned with the laser die 210, such that the planar arrangement of the cores 105-1, 105-2, 105-3, 105-4 is aligned with the planar arrangement of the plurality of channels 215-1, 215-2, 215-3, 215-4. In some embodiments, a six (6)-axis alignment is performed to optically align the multicore optical fiber 205 with the laser die 210. Notably, an angular alignment of the cores 105-1, 105-2, 105-3, 105-4 would not be performed for aligning a single core optical fiber. In some embodiments, the planar arrangement of the cores 105-1, 105-2, 105-3, 105-4 corresponds to a plane of the endface 240.

The multicore optical fiber 205 may be rigidly attached with the laser die 210 when rotationally aligned (e.g., using an adhesive or welding process). Thus, when the multicore optical fiber 205 is rotationally aligned with the laser die 210, the channel 215-1 provides the optical signal 235-1 to the core 105-1, the channel 215-2 provides the optical signal 235-2 to the core 105-2, and so forth.

In some embodiments, the pitch between adjacent cores 105-1, 105-2, 105-3, 105-4 and/or the pitch between adjacent channels 215-1, 215-2, 215-3, 215-4 is small enough that some or all of the optical components may be shared between the cores 105-1, 105-2, 105-3, 105-4 and/or the channels 215-1, 215-2, 215-3, 215-4. As shown in the diagram 200, the single lens 225 and the single optical isolator 230 are shared by all of the cores 105-1, 105-2, 105-3, 105-4 and the channels 215-1, 215-2, 215-3, 215-4. In some embodiments, the pitch between adjacent channels 215-1, 215-2, 215-3, 215-4 is small enough that the offset of the channels 215-1, 215-2, 215-3, 215-4 from the optical axis of the lens 225 contributes only negligible aberration without degrading optical coupling, when compared with an on-axis optical system.

Using these techniques, packaging density may be increased as fewer optical fibers, optical isolators, lenses, and/or laser dies are needed when optically coupling the laser die 210 and the multicore optical fiber 205. Further, material and/or process costs during manufacturing may be reduced as fewer components are used, which also corresponds to fewer optical alignment processes.

As discussed above, the various components and their relative arrangement are not drawn to scale in the diagram 200. In some embodiments, and as shown in the diagram 200, the pitch between adjacent channels 215-1, 215-2, 215-3, 215-4 is greater than the pitch between adjacent cores 105-1, 105-2, 105-3, 105-4. However, in other embodiments, the pitch between adjacent channels 215-1, 215-2, 215-3, 215-4 may be less than or equal to the pitch between adjacent cores 105-1, 105-2, 105-3, 105-4.

Figure 3:
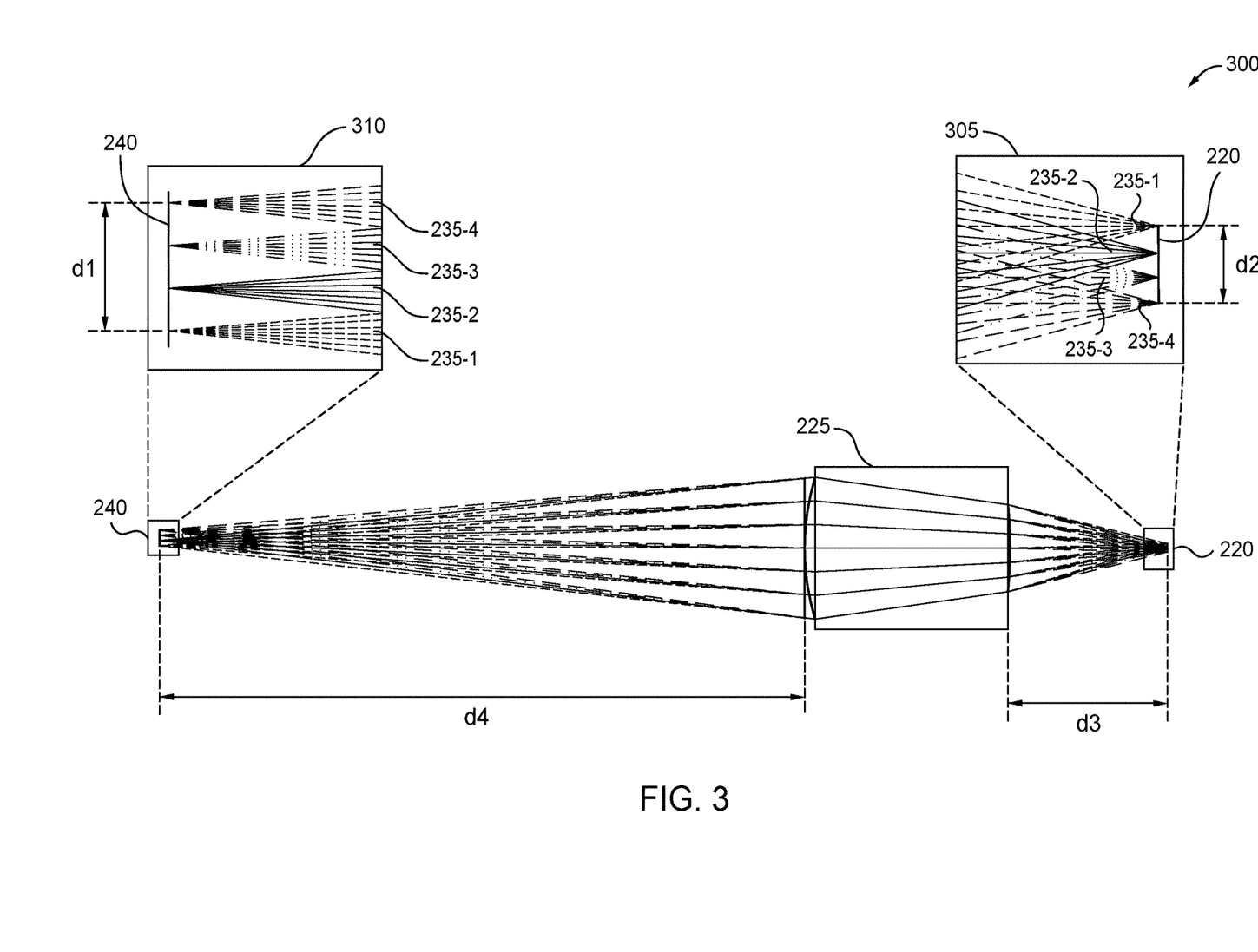
FIG. 3 is a diagram illustrating exemplary alignment of a multicore optical fiber, a lens, and a multi-channel laser die, according to one or more embodiments.

For example, FIG. 3 is a diagram 300 illustrating an exemplary alignment of a multicore optical fiber, a lens, and a multi-channel laser die, where a pitch between adjacent channels is less than a pitch between adjacent cores. The features illustrated in the diagram 300 may be used in conjunction with other embodiments. For example, diagram 300 represents one possible implementation of the optical system shown in FIG. 2.

In the diagram 300, an inset portion 305 shows the optical signals 235-1, 235-2, 235-3, 235-4 exiting the facet 220 of the laser die. The optical signals 235-1, 235-2, 235-3, 235-4 are incident on the lens 225 and directed toward the endface 240 of the multicore optical fiber. An inset portion 310 shows the optical signals 235-1, 235-2, 235-3, 235-4 being received at the endface 240. Although not shown here, an optical isolator may be arranged between the lens 225 and the endface 240.

The optical signals 235-1, 235-2, 235-3, 235-4 exit along a length of the facet 220 having a distance d2, and the optical signals 235-1, 235-2, 235-3, 235-4 are received along a length of the endface 240 having a distance d1. In some embodiments, the endface 240 of the multicore optical fiber and the facet 220 of the laser die are parallel, and adjacent ones of the optical signals 235-1, 235-2, 235-3, 235-4 are equidistant at the endface 240 and at the facet 220.

The lens 225 provides a given magnification imaging the mode size of the optical signals 235-1, 235-2, 235-3, 235-4 exiting the facet 220 of the laser die onto the mode size of the cores at the endface 240. In some embodiments, the magnification of the lens 225 is positive.

The magnification of the lens 225 also affects the pitch between adjacent cores of the optical fibers. For example, in a case where the lens 225 has a magnification M=3 the pitch between the optical waveguides of the laser die should be three (3) times narrower than the pitch of the cores in the multicore optical fiber. In some embodiments, the distance d1 is between about 60-90 microns, which for an implementation having four (4) linearly arranged cores corresponds to a pitch between about 20-30 microns between adjacent cores. Other values of the distance d1 are also contemplated. The distance d2 may have any suitable value, e.g. based on the design of the optical system, including the magnification of the lens 225. For example, the distance d2 may be approximately 30 microns, which corresponds to an approximately 10 micron pitch between adjacent channels.

The size of the lens 225, the spacing between the lens 225 and the multicore optical fiber, and the spacing between the lens 225 and the facet 220 may be selected based on the distances d1, d2. In some embodiments, aligning the multicore optical fiber to the laser die through the lens 225 comprises arranging the multicore optical fiber at a distance d4 from the lens 225. The distance d4 is based on a magnification of the lens 225 and is selected to (i) match a mode size of the multiple channels to a mode size of the plurality of optical cores, and (ii) match a pitch between adjacent channels of the multiple channels to a pitch between adjacent cores of the plurality of optical cores.

In some embodiments, the distance d4 between the lens 225 and the multicore optical fiber (i.e., the endface 240) is between about two (2) times and about five (5) times a distance d3 between the lens 225 and the facet 220. In one non-limiting example, the pitch between adjacent cores of the plurality of optical cores is between about 20 and 30 microns, the distance d4 is about 3000 microns, and the second distance is about 1000 microns. For this combination of distances d3, d4, a relatively large aperture of the lens 225 is capable of supporting the multiple channels. When compared with the distances d3, d4, the relatively small offset of the channels 215-1, 215-2, 215-3, 215-4 from the optical axis of the lens 225 contributes only negligible aberration without degrading optical coupling, when compared with an on-axis optical system.

Figure 4:
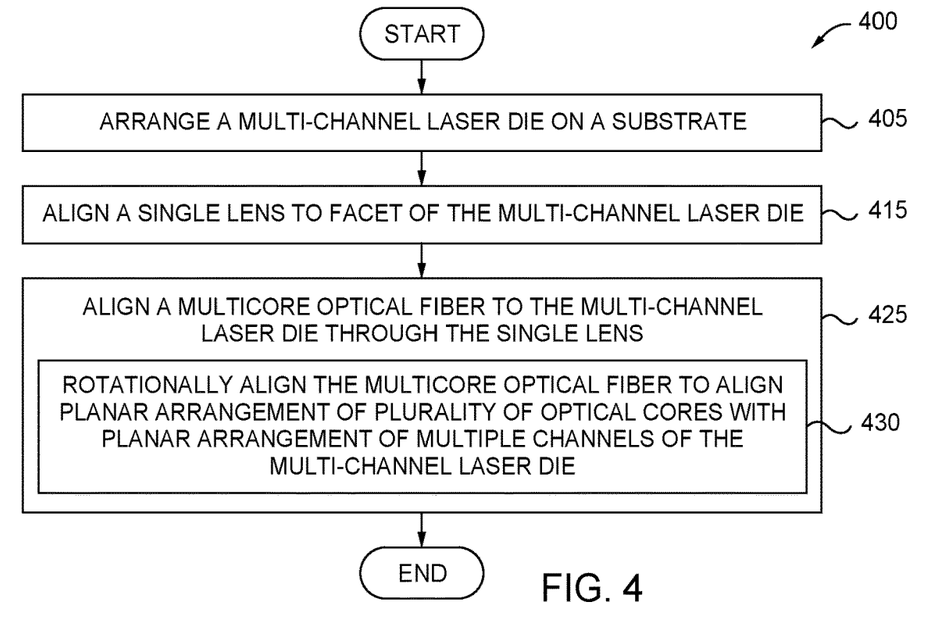
FIG. 4 is an exemplary method of forming an optical device, according to one or more embodiments.

FIG. 4 is an exemplary method 400 of forming an optical device, according to one or more embodiments. The method 400 may be used in conjunction with other embodiments, e.g., to form the optical system shown in FIG. 3.

The method 400 begins at block 405, where a multi-channel laser die is arranged on a substrate. The substrate may be formed of any suitable material, such as silicon or ceramic. In some embodiments, arranging the multi-channel laser die comprises epitaxially growing III-V material layers on the substrate. In other embodiments, the multi-channel laser die is attached to another substrate, and arranging the multi-channel laser die comprises attaching the substrates together (e.g., bonding, soldering).

At block 415, a single lens is aligned to the facets of the multi-channel laser die either actively or passively. At block 425, a multicore optical fiber is aligned to the multi-channel laser die through the single lens.

In some embodiments, aligning the multicore optical fiber to the multi-channel laser die comprises arranging the multicore optical fiber at a first distance from the single lens, wherein the first distance is based on a magnification of the single lens and is selected to (i) match a mode size of the multiple channels to a mode size of the plurality of optical cores, and (ii) match a pitch between adjacent channels of the multiple channels to a pitch between adjacent cores of the plurality of optical cores.

In some embodiments, aligning the multicore optical fiber to the multi-channel laser die comprises rotationally aligning the multicore optical fiber, which aligns a planar arrangement of a plurality of optical cores with a planar arrangement of multiple channels of the multi-channel laser die (block 430).

In some embodiments, the multicore optical fiber is rigidly attached with the multi-channel laser die when rotationally aligned, for example, by applying and curing an adhesive or welding process. The method 400 ends following completion of block 425.

Figure 5:
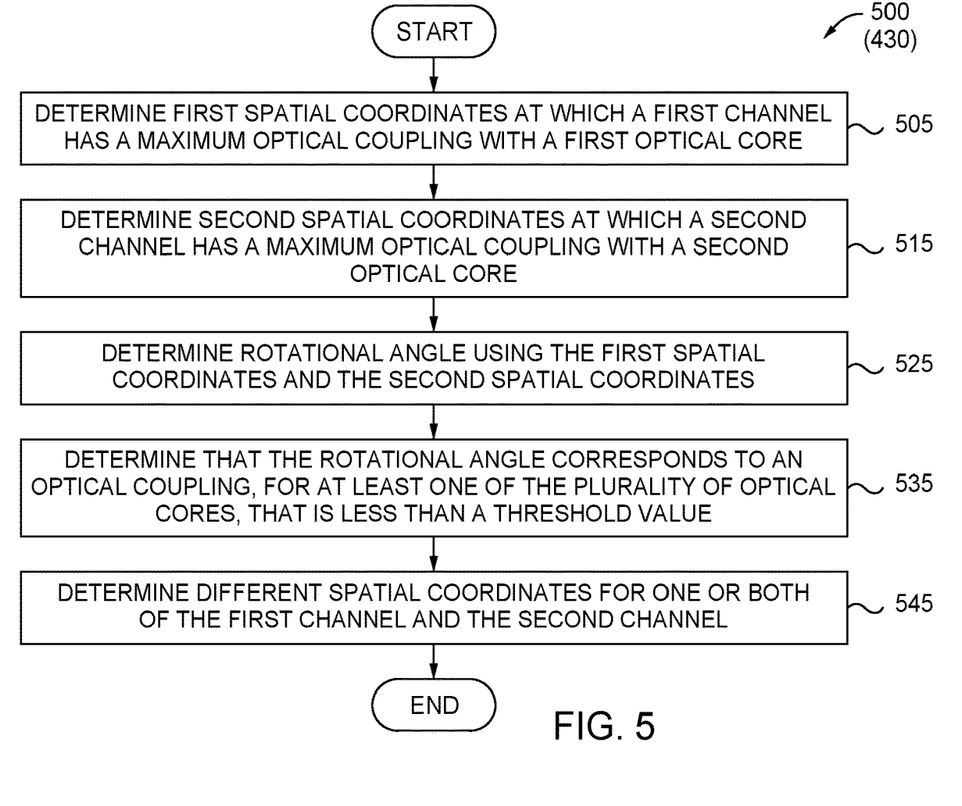
FIG. 5 is an exemplary method of rotationally aligning a multicore optical fiber to align with a multi-channel laser die, according to one or more embodiments.

FIG. 5 is an exemplary method 500 of rotationally aligning a multicore optical fiber to align with a multi-channel laser die, according to one or more embodiments. The method 500 may be used in conjunction with other embodiments, e.g., within block 430 of FIG. 4.

The method 500 begins at block 505, where first spatial coordinates are determined for the multicore optical fiber, at which a first channel has a maximum optical coupling with a first optical core. At block 515, second spatial coordinates are determined for the multicore optical fiber, at which a second channel has a maximum optical coupling with a second optical core. The first spatial coordinates and/or the second spatial coordinates may be represented as two dimensions or three dimensions. In some embodiments, the first optical core and the second optical core are furthest from each other along a particular dimension. However, the first optical core and the second optical core may be selected according to any other suitable techniques. Further, in other embodiments, spatial coordinates may be calculated for more than two optical cores of the multicore optical fiber.

At block 525, a rotational angle for the multicore optical fiber is determined using the first spatial coordinates and the second spatial coordinates. In some embodiments, the multicore optical fiber is rotated according to the rotational angle and/or spatially translated. In some embodiments, the multicore optical fiber is spatially translated to averaged spatial coordinates, e.g., at a midpoint between the first spatial coordinates and the second spatial coordinates.

At block 535, it is determined that the rotation angle corresponds to an optical coupling, for at least one of the plurality of optical cores, that is less than a threshold value. In some embodiments, the determination is responsive to measurements of test optical signals transmitted from the multi-channel laser die. Generally, the optical coupling being less than the threshold value indicates that an unsuitable optical coupling exists for the at least one optical core. At block 545, different spatial coordinates are determined for one or both of the first channel and the second channel. The method 500 may return to block 525 using the different spatial coordinates, and may proceed until the determined rotational angle corresponds to a suitable optical coupling for each of the optical cores. In some embodiments, determining the suitable optical coupling comprises determining a spatial balance between the first spatial coordinates and the second spatial coordinates (e.g., if not aligning exactly with the pitch of the multicore optical fiber). The method 500 ends following block 545.

Figure 6A:
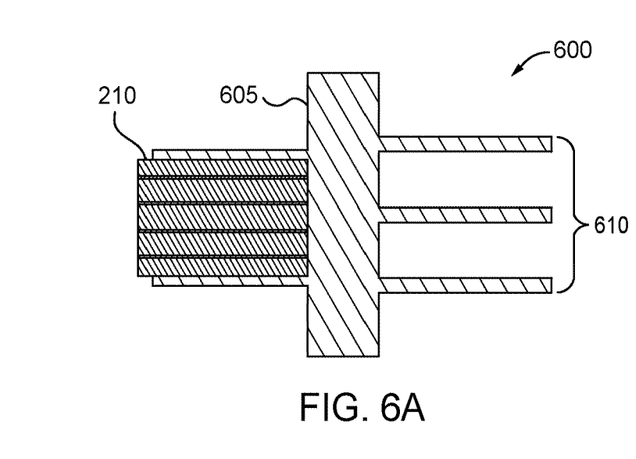
FIGS. 6A, 6B, and 6C illustrate an exemplary sequence of forming an optical device within a Transistor Outline (TO) CAN package, according to one or more embodiments.
Figure 6B:
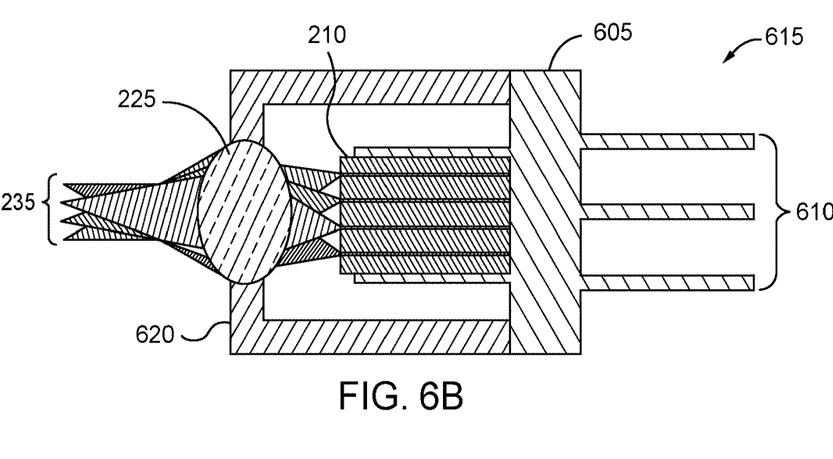
Figure 6C:
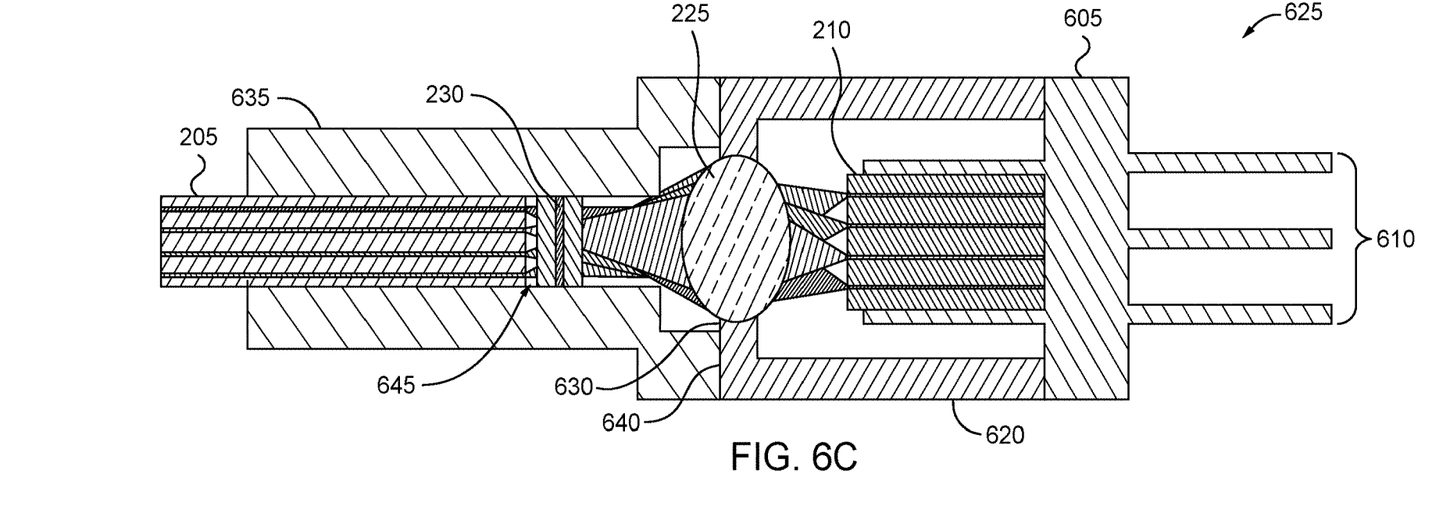

FIGS. 6A, 6B, and 6C illustrate an exemplary sequence of forming an optical device within a Transistor Outline (TO) CAN package, according to one or more embodiments. The features illustrated in diagrams 600, 615, and 625 may be used in conjunction with other embodiments. For example, a process of assembling the TO CAN package may operate to optically align the components of the optical system shown in FIG. 2. Note that the various components and the relative arrangement of the components are not drawn to scale in the diagrams 600, 615, and 625.

In the diagram 600, the laser die 210 is mounted to a base 605 (representing a first housing component) and conductively connected with leads 610 providing external connectivity to the TO CAN package. The base 605 may be formed of any suitable material, such as a metal. In some embodiments, the laser die 210 is arranged on a substrate, which may operate as a submount that is attached to the base 605 (i.e., arranged on the first housing component). In some embodiments, the submount provides electrical connections between the laser die 210 and the leads 610.

In the diagram 615, a cap 620 (representing a second housing component) is contacted to the base 605, such that the laser die 210 is arranged in an interior space formed by the base 605 and the cap 620. The cap 620 may be formed of any suitable material, such as a metal. The lens 225 is arranged at an opening of the cap 620. As discussed above, the lens 225 may have a positive magnification that images the mode size of the optical signals 235 exiting the laser die 210 onto the mode size of the cores of the multicore optical fiber 205. By translating the cap 620 relative to the base 605, the lens 225 may be aligned to a facet of the laser die 210 in two spatial dimensions. Once the lens 225 is aligned to the facet, the cap 620 may be rigidly attached to the base 605 (e.g., through welding).

In the diagram 625, a surface 640 of an optical connector 635 is contacted to a surface 630 of the cap 620. The optical connector 635 may have any suitable implementation, such as a fiber pigtail or a receptacle. The multicore optical fiber 205 is rigidly attached to the optical connector 635. In some embodiments, the multicore optical fiber 205 is inserted into an interior space 645 of the optical connector 635, and retained by the optical connector 635 using any suitable means, such as an adhesive, a friction fit, and so forth.

In some embodiments, the optical isolator 230 is arranged in the interior space 645 and is aligned with the multicore optical fiber 205 when inserted. By translating and/or rotating the optical connector 635 relative to the cap 620, the multicore optical fiber 205 may be aligned, through the optical isolator 230 and the lens 225, to the facet of the laser die 210 in three spatial dimensions (and rotationally). Once the multicore optical fiber 205 is aligned to the facet, the optical connector 635 may be rigidly attached to the cap 620 (e.g., through welding). In this way, aligning the multicore optical fiber 205 to the laser die 210 comprises attaching the optical connector 635 with a housing component (e.g., attached with the base 605 through the cap 620).

Figure 7A:
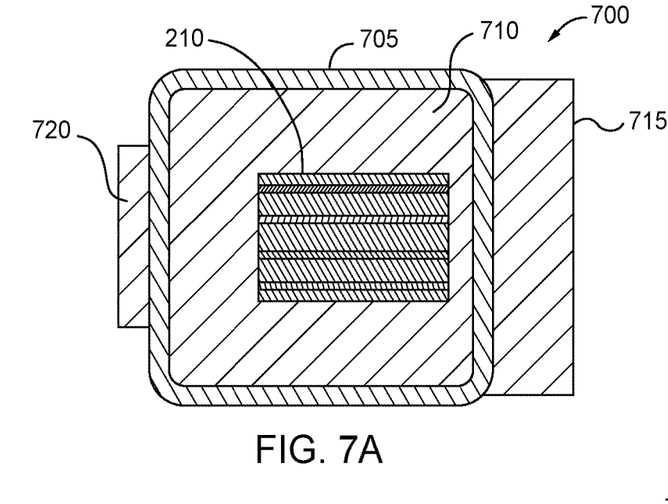
FIGS. 7A, 7B, and 7C illustrate an exemplary sequence of forming an optical device within a box-type Transmitter Optical Sub-Assembly package, according to one or more embodiments.
Figure 7B:
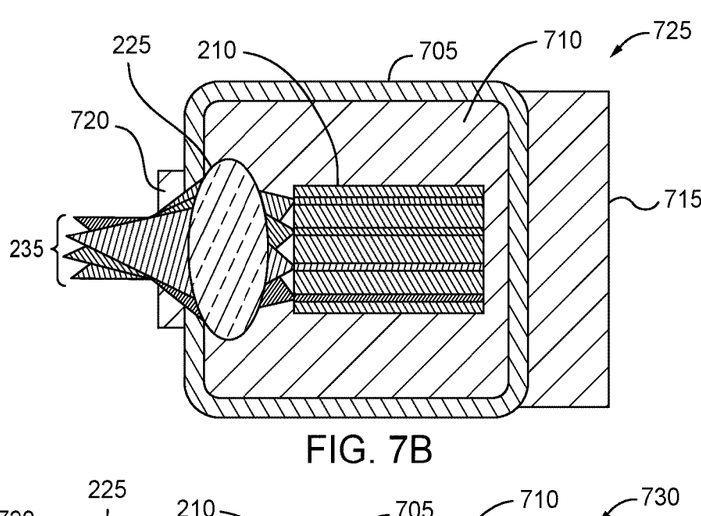
Figure 7C:
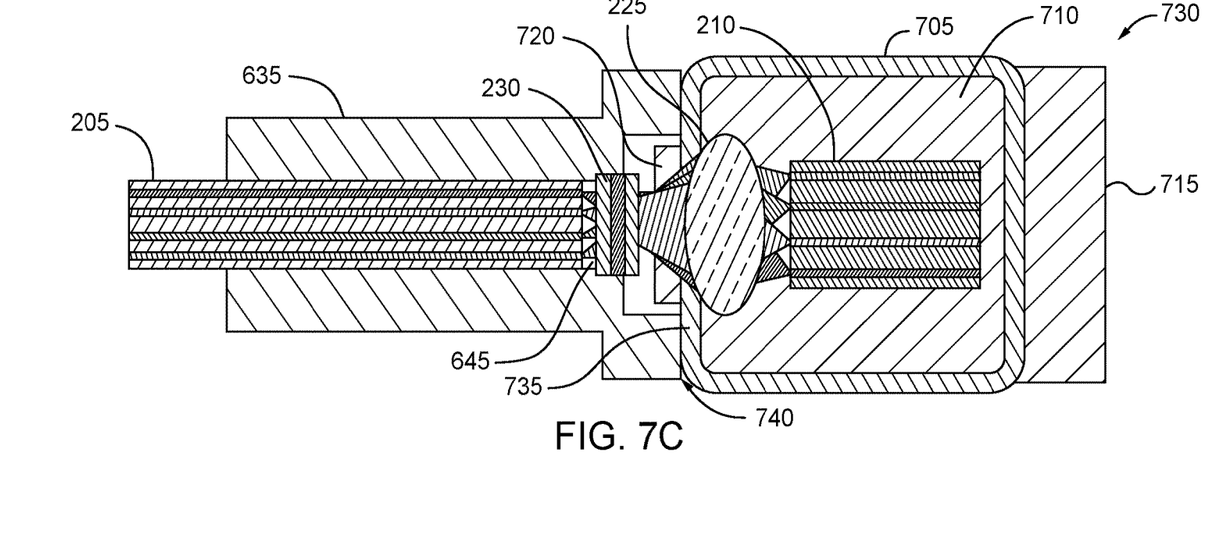

FIGS. 7A, 7B, and 7C illustrate an exemplary sequence of forming an optical device within a box-type Transmitter Optical Sub-Assembly (TOSA) package, according to one or more embodiments. The features illustrated in diagrams 700, 725, and 730 may be used in conjunction with other embodiments. For example, a process of assembling the box-type TOSA package may operate to optically align the components of the optical system shown in FIG. 2. Note that the various components and the relative arrangement of the components are not drawn to scale in the diagrams 700, 725, and 730.

In the diagram 700, the box-type TOSA package comprises sidewalls 705, an interior surface 710 arranged within the sidewalls 705, and a base 715 attached to the sidewalls 705. The box-type TOSA package may be formed of any suitable materials. For example, the sidewalls 705, the interior surface 710, and/or the base 715 may be formed from metals such as a nickel-cobalt ferrous alloy, cold-rolled steel, or a copper-tungsten composite. In some embodiments, exterior surfaces of the sidewalls 705 may be gold-coated.

An opening 720 is defined through one of the sidewalls 705. Although not depicted, the box-type TOSA package may further comprise conductive leads attached to the base 715 and providing external connectivity to the box-type TOSA package.

The laser die 210 is mounted to the interior surface 710 and is conductively connected with the leads providing external connectivity to the box-type TOSA package. In some embodiments, the laser die 210 is arranged on a substrate, which may operate as a submount that is attached to the interior surface 710. In some embodiments, the submount provides electrical connections between the laser die 210 and the leads.

The lens 225 is arranged within the interior space defined by the sidewalls 705, at the opening 720. As discussed above, the lens 225 may have a positive magnification that images the mode size of the optical signals 235 exiting the laser die 210 onto the mode size of the cores of the multicore optical fiber 205. By translating the lens 225 relative to the laser die 210, the lens 225 may be aligned to a facet of the laser die 210 in three spatial dimensions. Once the lens 225 is aligned to the facet, the lens 225 may be rigidly attached to a structure within the interior space defined by the sidewalls 705.

In the diagram 730, a surface 740 of the optical connector 635 is contacted to a surface 735 of one of the sidewalls 705. By translating and/or rotating the optical connector 635 relative to the surface 735, the multicore optical fiber 205 may be aligned, through the optical isolator 230 and the lens 225, to the facet of the laser die 210 in three spatial dimensions (and rotationally). Once the multicore optical fiber 205 is aligned to the facet, the optical connector 635 may be rigidly attached to the sidewalls 705 (e.g., through welding). In this way, aligning the multicore optical fiber 205 to the laser die 210 comprises attaching the optical connector 635 with a housing component (e.g., attached with the sidewalls 705).

Figure 8:
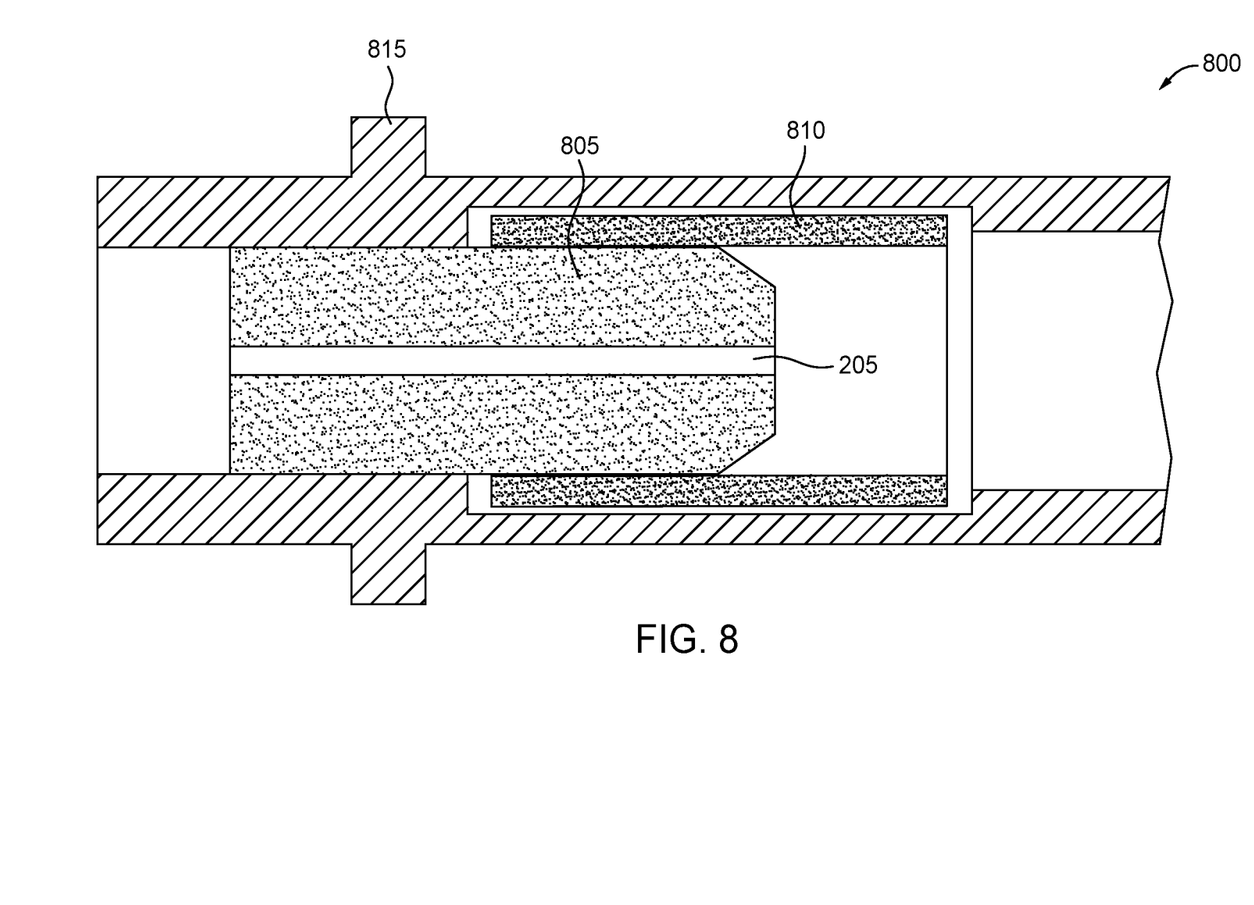
FIG. 8 is a diagram illustrating an exemplary optical alignment of a multicore optical fiber, according to one or more embodiments.

FIG. 8 is a diagram 800 illustrating an exemplary optical alignment of a multicore optical fiber 205, according to one or more embodiments. The features illustrated in FIG. 8 may be used in conjunction with other embodiments, e.g., an exemplary connection of the multicore optical fiber 205 with the optical connector 635 as shown in FIGS. 6C and 7C.

In the diagram 800, a ferrule 805 surrounds the multicore optical fiber 205 and ensures alignment of the multicore optical fiber 205 during connector mating. The ferrule 805 may be formed of any material having suitable rigidity, such as ceramic, stainless steel, plastic, or tungsten carbide. The ferrule 805 and the multicore optical fiber 205 may be rigidly attached to each other using any suitable techniques, such as adhesive or crimping. In some cases, an end of the ferrule 805 may be polished after rigidly attaching the multicore optical fiber 205, e.g., to provide an improved optical interface.

Once rigidly attached with the multicore optical fiber 205, the ferrule 805 is inserted into a split sleeve 810. A connector body 815 surrounds the assembly of the multicore optical fiber 205, the ferrule 805, and the split sleeve 810. In some embodiments, the ferrule 805 may be permitted to rotate within the connector body 815 to support the angular alignment of the cores of the multicore optical fiber 205. In some embodiments, one or more additional optical components may be housed within the connector body 815.

Various techniques have been described for optical coupling a multi-channel laser die with a multicore optical fiber, which may include a polarization-maintaining multicore optical fiber. In some embodiments, a single lens is used to couple with multiple channels of the laser die, which eliminates a requirement for a minimum free space channel or channel pitch. Having a narrower channel pitch permits a single optical isolator to be shared by all channels.

Certain types of packaging provide relatively large working distances (e.g., about 1 mm object distance from the laser die to the lens, and about 3-5 mm image distance from the lens to the multicore optical fiber, in a TO CAN package), which corresponds to a large lens aperture that supports multiple channels. Although some or all of the multiple channels have an offset from an optical axis of the optical system, the relatively large working distances contribute only negligible aberration without degrading optical coupling, when compared with an on-axis optical system.

Further, optical coupling a multi-channel laser die with a multicore optical fiber may leverage existing assembly processes for single-channel optical coupling. For example, the laser die may be arranged on a substrate, a lens is actively or passively aligned in two dimensions (e.g., placing a cap including the lens), and an active fiber pigtail or receptacle is aligned in three dimensions and actively rotationally aligned to align the planar arrangements of the channels of the laser die and the cores of the multicore fiber. In some cases, the same materials and assembly equipment may be used as for single-channel optical coupling.

One exemplary application of the techniques described herein is assembling a multi-channel directly-modulated or continuous-wave laser package. Current packaging techniques may include the entire transmitter inside an expensive hermetic package, although only the laser source requires temperature regulation. In contrast, the techniques described herein enable a single small and inexpensive laser package that supports all of the laser channels. The package can be efficiently wavelength-stabilized with a single thermoelectric cooler that cools only the laser source. With the increase in packaging density, all of the laser channels may fit easily into existing transceiver module form factors.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
arranging a laser die on a substrate, wherein the laser die has multiple channels that are arranged with a first planar arrangement proximate to a facet of the laser die, wherein the substrate is arranged on a housing component;
aligning a single lens to the facet; and
aligning a multicore optical fiber to the laser die through the single lens, wherein the multicore optical fiber has a plurality of optical cores that are arranged with a second planar arrangement, and wherein aligning the multicore optical fiber to the laser die comprises:
attaching the multicore optical fiber to the housing component; and
rotationally aligning the multicore optical fiber to align the second planar arrangement with the first planar arrangement.

2. The method of claim 1,
wherein aligning the multicore optical fiber to the laser die optically couples the laser die to the multicore optical fiber through the single lens and a facet of the multicore optical fiber.

3. The method of claim 1,
wherein the housing component is a base, and
wherein the single lens is included in a cap configured to attach to the base.

4. The method of claim 1, wherein aligning the multicore optical fiber to the laser die through the single lens comprises:
arranging the multicore optical fiber at a first distance from the single lens, wherein the first distance is based on a magnification of the single lens and is selected to (i) match a mode size of the multiple channels to a mode size of the plurality of optical cores, and (ii) match a pitch between adjacent channels of the multiple channels to a pitch between adjacent cores of the plurality of optical cores.

5. The method of claim 4,
wherein the first distance is between two (2) times and five (5) times a second distance between the single lens and the facet.

6. The method of claim 5, wherein a pitch between adjacent cores of the plurality of optical cores is between 20 and 30 microns.

7. The method of claim 1, wherein rotationally aligning the multicore optical fiber comprises:
determining first spatial coordinates at which a first channel of the multiple channels has a maximum optical coupling with a first optical core of the plurality of optical cores;
determining second spatial coordinates at which a second channel of the multiple channels has a maximum optical coupling with a second optical core of the plurality of optical cores; and
determining a rotational angle using the first spatial coordinates and the second spatial coordinates.

8. The method of claim 7, wherein rotationally aligning the multicore optical fiber further comprises:
determining that the rotational angle corresponds to an optical coupling, for at least one of the plurality of optical cores, that is less than a threshold value; and
determining different spatial coordinates for one or both of the first channel and the second channel.

9. An optical device comprising:
a housing component;
a substrate arranged on the housing component;
a laser die arranged on the substrate, wherein the laser die has multiple channels that are arranged with a first planar arrangement proximate a facet of the laser die;
a single lens aligned to the facet; and a multicore optical fiber attached to the housing component and aligned to the laser die through the single lens, wherein the multicore optical fiber has a plurality of optical cores that are arranged with a second planar arrangement, wherein the multicore optical fiber is rotationally arranged such that the second planar arrangement is aligned with the first planar arrangement.

10. The optical device of claim 9, further comprising: a single optical isolator shared by the multiple channels.

11. The optical device of claim 9, further comprising: wherein the multicore optical fiber is optically coupled to the laser die through the single lens and a facet of the multicore optical fiber.

12. The optical device of claim 9,
wherein the housing component is a base, and
wherein the single lens is included in a cap attached to the base.

13. The optical device of claim 9, wherein the multicore optical fiber is arranged at a first distance from the single lens, wherein the first distance is based on a magnification of the single lens and is selected to (i) match a mode size of the multiple channels to a mode size of the plurality of optical cores, and (ii) match a pitch between adjacent channels of the multiple channels to a pitch between adjacent cores of the plurality of optical cores.

14. The optical device of claim 13,
wherein the first distance is between two (2) times and five (5) times a second distance between the single lens and the facet.

15. The optical device of claim 14, wherein a pitch between adjacent cores of the plurality of optical cores is between 20 microns and about 30 microns.

16. A computer program product comprising:
a computer-readable storage medium having computer-readable program code embodied therewith, the computer-readable program code executable by one or more computer processors to perform an operation comprising:
arranging a laser die on a substrate, wherein the laser die has multiple channels that are arranged with a first planar arrangement proximate to a facet of the laser die, wherein the substrate is arranged on a housing component;
aligning a single lens to the facet; and
aligning a multicore optical fiber to the laser die through the single lens, wherein the multicore optical fiber has a plurality of optical cores that are arranged with a second planar arrangement, and wherein aligning the multicore optical fiber to the laser die comprises:
attaching the multicore optical fiber to the housing component; and
rotationally aligning the multicore optical fiber to align the second planar arrangement with the first planar arrangement.

17. The computer program product of claim 16,
wherein aligning the multicore optical fiber to the laser die optically couples the laser die to the multicore optical fiber through the single lens and a facet of the multicore optical fiber.

18. The computer program product of claim 16,
wherein the housing component is a base, and
wherein the single lens is included in a cap configured to attach to the base.

19. The computer program product of claim 16, wherein rotationally aligning the multicore optical fiber comprises:
determining first spatial coordinates at which a first channel of the multiple channels has a maximum optical coupling with a first optical core of the plurality of optical cores;
determining second spatial coordinates at which a second channel of the multiple channels has a maximum optical coupling with a second optical core of the plurality of optical cores; and
determining a rotational angle using the first spatial coordinates and the second spatial coordinates.

20. The computer program product of claim 19, wherein rotationally aligning the multicore optical fiber further comprises:
determining that the rotational angle corresponds to an optical coupling, for at least one of the plurality of optical cores, that is less than a threshold value; and
determining different spatial coordinates for one or both of the first channel and the second channel.

* * * * *